(No Model.)
G. COLLINS.
TEA KETTLE NOZZLE.
No. 359,061. Patented Mar. 8, 1887.
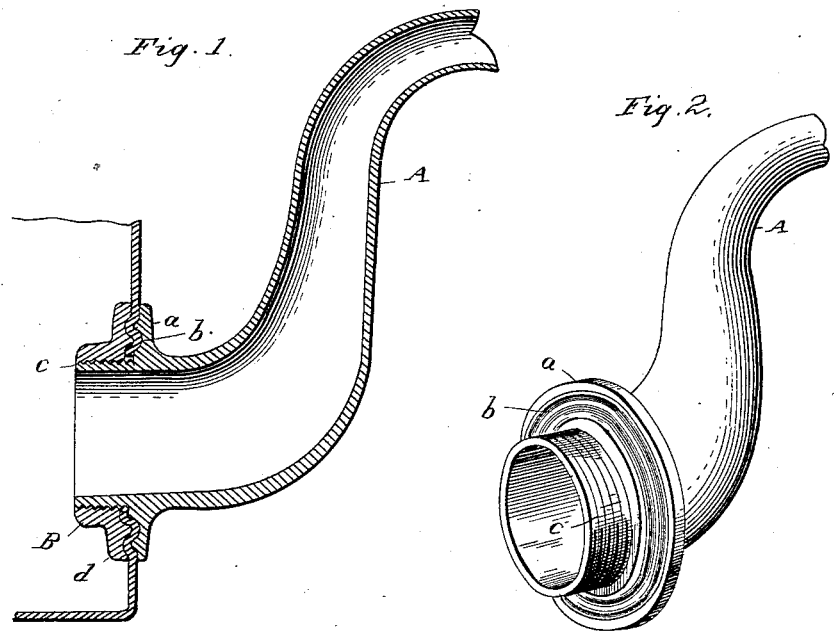
Witnesses
C. H. Raeder.
E. H. Bond.
Inventor
George Collins
By his Attorney
T. J. W. Robertson

UNITED STATES PATENT OFFICE.

GEORGE COLLINS, OF DETROIT, MICHIGAN.

TEA-KETTLE NOZZLE.

SPECIFICATION forming part of Letters Patent No. 359,061, dated March 8, 1887.

Application filed October 26, 1886. Serial No. 217,215. (No model.)

*To all whom it may concern:*

Be it known that I, GEORGE COLLINS, of Detroit, in the county of Wayne and State of Michigan, have invented new and useful Improvements in Tea-Kettle Nozzles; and I do hereby declare that the following is a full, clear, and exact description thereof, reference being had to the accompanying drawings, which form a part of this specification.

The nature of my invention is a new and useful improvement in the construction of nozzles or spouts for vessels which are made of sheet metal; and it consists in the peculiar combinations and the novel construction and arrangement of parts, all as more fully hereinafter described and claimed.

Figure 1 is a perspective view of my improved spout as attached to the section of wall of a sheet-metal vessel. Fig. 2 is a perspective of the inner end of the spout with the other parts detached. Fig. 3 is a perspective of the inner side of the annular nut.

In the accompanying drawings, which form a part of this specification, A represents a spout of cast metal provided with a flange, $a$, the inner face of which is provided with annular corrugations $b$, and the inner end of the spout is threaded, as shown at $c$.

B is an annular nut threaded to fit the end of the spout, and is provided with a flange, $d$, the inner face of which is provided with annular corrugations $e$.

In practice a hole is cut through the sheet metal at the proper point of sufficient size to receive the threaded end of the spout. The nut B is then screwed up with sufficient force to compress the sheet metal into the corrugations on the flanges of the nut and spout, thereby making a perfectly tight joint, which may still further be tightened, if necessary, by an additional turn of the nut.

What I claim as my invention is—

1. As an improved article of manufacture, a cast-metal spout having a grooved flange, $a$, and threaded extension $c$ and a nut, B, provided with a correspondingly-grooved flange, $d$, substantially as described.

2. The combination of a cast-metal fitting having a flange or shoulder grooved on its inner face with a plate having a grooved face and a sheet-metal vessel to which the fitting is to be attached, whereby the sheet-metal vessel is corrugated at the joint when the joint is set, substantially as described, and for the purpose set forth.

GEORGE COLLINS.

Witnesses:
H. S. SPRAGUE,
JOHN SCHUMAN.